United States Patent Office 3,657,373
Patented Apr. 18, 1972

3,657,373
PROCESS FOR THE PREPARATION OF OLEFINS USING CARBONYL COMPOUNDS AND SILYL-SUBSTITUTED ORGANOMETALLIC COMPOUNDS
Donald J. Peterson, Springfield Township, Hamilton County, Ohio, assignor to The Procter & Gamble Company, Cincinnati, Ohio
No Drawing. Original application Dec. 26, 1967, Ser. No. 693,084, now Patent No. 3,517,042, dated June 23, 1970. Divided and this application Apr. 2, 1970, Ser. No. 25,269
Int. Cl. C07c 11/02
U.S. Cl. 260—677         2 Claims

ABSTRACT OF THE DISCLOSURE

A process for the conversion of carbonyl compounds to the corresponding olefins using trialkylsilyl-organometallic compounds.

---

This is a divisional application of my copending application, Ser. No. 693,084, filed Dec. 26, 1967, now Pat. No. 3,517,042, June 23, 1970.

OBJECTS OF THE INVENTION

An object of this invention is the formation of olefinic compounds in good yields from a variety of carbonyl-containing compounds.

A further object of this invention is to prepare compounds useful as chemicals for the prepration of plastics, resins and synthetic rubbers.

A further object of this invention is to prepare olefinic compounds heretofore difficult to obtain.

BACKGROUND OF THE INVENTION

Several methods are known in the prior art for the conversion of carbonyl compounds to the corresponding methylene derivatives. The most common and most frequently used method for this conversion has the common feature of employing phosphorus-substituted carbanions, the well-known "Wittig" reagents, which are phosphorous ylids, as the reactive intermediates, see A. W. Johnson, Ylid Chemistry, Academic Press, Inc., New York (1966). The phosphinyl-alkyl metal compounds, L. Horner, H. Hoffman, H. G. Wippel, and G. Klahre, Chem. Ber. 92, 2499 (1959), and the phosphonate carbanions, W. S. Wadsworth, Jr., and W. D. Emmons, J. Am. Chem. Soc., 83, 1733 (1961), have also been employed to convert carbonyl compounds to their corresponding olefins. In addition, the α-lithiophosphonic acid bisamides, E. J. Corey and G. T. Kwiatkowski, J. Am. Chem. Soc., 88, 5652 (1966), and the O,O'-dialkyl-α-lithiophosphonothioate esters, E. J. Corey and G. T. Kwiatkowski, J. Am. Chem. Soc., 88, 5654 (1966), as phosphorous-substituted carbanions also have been used to form olefins from carbonyl compounds. In addition to the organophosphorous compounds, a boron-substituted carbanion, G. Cainelli, G. Dal Bello, G. Zubiani, Tetrahedron Letters, 4315 (1966), a sulfur-substituted carbanion, E. J. Corey and T. Durst, J. Am. Chem. Soc., 88, 5656 (1966), and a silicon-phosphorous-substituted carbanion, H. Gilman and R. A. Tomasi, J. Org. Chem., 27, 3647 (1962), have been used to produce olefins from carbonyl compounds.

Although the course of the reaction and the products obtained will depend on the specific carbanion, hereinbefore described, and carbonyl compound used, the formation of olefins by the use of an heteroatom-substituted carbanion can be summarized as follows using the well-known "Wittig" reagents as the carbanion $$R'_3\overset{+}{P}-\overset{-}{C}H_2 + R''\overset{O}{\overset{\|}{C}}R'' \longrightarrow R'_3\overset{+}{P}-CH_2-\overset{|}{\underset{O^-}{C}}-R''_2$$

$$\begin{bmatrix} R'_3-P-CH_2 \\ | \quad | \\ O-CR''_2 \end{bmatrix} \longrightarrow R'_3P=O + R''_2C=CH_2$$

wherein R' and R" are hydrocarbon groups.

SUMMARY OF THE INVENTION

The present invention relates, primarily to a process consisting of reacting a metalated silane with a carbonyl compound to produce an olefinic compound. The process of the present invention is summarized below as:

$$(R^1R^2R^3)Si\underset{X}{\overset{H}{\underset{|}{C}}}M + R^4\overset{O}{\overset{\|}{C}}R^5 \longrightarrow (R^1R^2R^3)SiOM + \underset{R^5}{\overset{R^4}{\diagdown}}C=C\underset{X}{\diagup}$$

wherein $R^1$, $R^2$, $R^3$, $R^4$, $R^5$, M and X are as hereinafter defined.

The present invention also relates to novel metalated silanes which can be used in the process of this invention for the preparation of olefinic compounds.

THE SILANES

The silanes suitable for the purposes of this invention and which are to be metalated with metalating agents, hereinafter described, are of the general formula $$(R^1R^2R^3)Si-\underset{H}{\overset{H}{\underset{|}{C}}}-X$$

wherein $R^1$, $R^2$ and $R^3$ each are saturated alkyl groups having from 1 to about 20 carbon atoms, wherein X is (1) hydrogen, (2) a halogen, such as bromine, chlorine or iodine, or (3) an electron-withdrawing group such as phenyl, methylthio, diphenylphosphino, diphenylthiophosphinyl, and trimethylsilyl groups.

Where X is hydrogen the silane described above is a trialkylmethylsilane.

Where X is a halogen such as chlorine, bromine or iodine, the silane described is a trialkyl(halomethyl)silane, e.g., the trialkyl(chloromethyl)silane, the trialkyl(bromomethyl)silane, and the trialkyl(iodomethyl)silane; and Where X is an electron-withdrawing group selected from the group consisting of phenyl, methylthio, diphenylphosphino, diphenylthiophosphinyl and trimethylsilyl groups, the silane described is a trialkyl(substituted-methyl)silane, e.g., the trialkyl(phenylmethyl)silane, the trialkyl(methylthiomethyl)silane, the trialkyl(diphenylthiophosphinylmethyl)silane, the trialkyl(diphenylphosphinomethyl)silane, and the trialkyl(trimethylsilylmethyl)silane.

Suitable $R^1$, $R^2$ and $R^3$ groups on the trialkylmethylsilanes, the trialkyl(halomethyl)silanes and the trialkyl-(substituted-methyl)silanes and subsequently on the corresponding trialkylsilylmethylmetals, and the trialkylsilyl-(substituted) methylmetals prepared upon reaction of the silanes with the appropriate metalating agents, described hereinafter, include straight chain, branched chain and cyclic saturated alkyl groups containing from 1 to about 20 carbon atoms (e.g., methyl, ethyl, n-propyl, isopropyl, n-butyl, 2-methylpropyl, n-pentyl, 2-methylbutyl, isopentyl, n-hexyl, 2-methylpentyl, 2,3-dimethylbutyl, 2,2-dimethylbutyl, n-heptyl, 2,2-dimethylpentyl, n-octyl, 2,2-dimethylhexyl, isooctyl, 2-ethylhexyl, n-nonyl, n-decyl, tripropylene, n-undecyl, n-dodecyl, tetrapropylene, n-tridecyl, n-tetradecyl, n-pentadecyl, n-hexadecyl, n-octadecyl, eicosyl, cyclopentyl, cyclohexyl, cyclooctyl, methylcyclohexyl, 2-cyclohexyldodecyl, 12-cyclohexyldodecyl, and dodecylcyclohexyl, said silanes having 40 or less carbon atoms and preferably less than 30 carbon atoms.

For the trialkylmethylsilane the preferred alkyl group is methyl and the preferred trialkylmethylsilane is tetramethylsilane; for the trialkyl(halomethyl)silane the preferred halogen is chlorine, the preferred alkyl group is methyl, and the preferred trialkyl(halomethyl)silane is trimethyl(chloromethyl)silane; and for the trialkyl(substituted-methyl)silane the preferred alkyl group is methyl, the preferred electron-withdrawing groups are the phenyl and the methylthio groups, and the preferred trialkyl(substituted-methyl)silanes are trimethyl(phenylmethyl)silane and trimethyl(methylthiomethyl)silane.

METALATING AGENTS

The metalating agents, hereinafter described, are reacted with the appropriate silanes to prepare the metalated silanes. Since X, as hereinbefore defined, can be a number of different moieties, the preparation of the metalated silanes will depend on the particular silane used as the starting material.

The trialkylmethylsilanes are reacted with a metalating agent selected from the group consisting of an alkylsodium, an alkylpotassium and a complex of an alkyllithium and an alkylenediamine, hereinafter described, to produce the trialkylsilylmethylmetals according to the following:

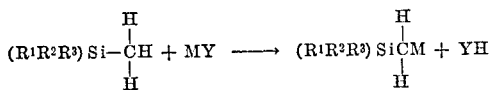

where
M=Na, Li or K
Y=alkyl group (This method of preparing the trialkylsilylmethylmetals is described in my copending application, Ser. No. 686,291, filed Nov. 28, 1967.)

Metalating agents which are useful in metalating the trialkylmethylsilanes are alkylsodiums and alkylpotassiums. The alkylsodiums and alkylpotassiums which are suitable for use in this invention are those wherein the alkyl group is a straight chain or branched chain group containing from 1 to about 20 carbon atoms. The metal atom is preferably attached to a primary carbon atom since the corresponding secondary or tertiary organometallic sodiums and potassiums are difficult, if not impossible, to prepare.

Suitable alkyl groups for the alkylsodiums and alkylpotassiums are methyl, ethyl, propyl, butyl, 3-methylbutyl, isopropyl, n-pentyl, isopentyl, n-hexyl, n-heptyl, n-octyl, n-decyl, tetrapropylene 4-propyldecyl, n-hexadecyl, n-dodecyl, and eicosyl.

Alkyllithiums are also suitable metalating agents for use in metalating the trialkylmethylsilanes. The alkyllithiums are preferably selected so that the point of attachment of the lithium is to a primary carbon atom. Alkyllithiums in which the attachment is at a secondary carbon atom can be used, however, they are less effective than those in which the lithium is attached through a primary carbon atom. Alkyllithiums in which the point of attachment is a tertiary carbon atom, e.g., t-butyllithium, are not effective.

Although it is possible to metalate using alkyllithiums alone, the metalation proceeds very slowly. The reactivity of the alkyllithium is increased considerably by complexation with a diamine, hereinafter described, in contrast to the situation with the alkylsodium and alkylpotassium, since their reactivity toward trialkylmethylsilane is not significantly altered by complexation with a diamine. The metalating complex of organolithium compounds and diamines is described by G. G. Eberhardt and W. A. Butte, in J. Org. Chem., 29, 2928 (1964) and A. W. Langer, Jr., in Trans. N.Y. Acad. Sci., Ser. II, 27, 741 (1965).

The diamine compound used in the complexation with the alkyllithium to increase its reactivity is shown as follows:

$$(R^6)(R^7)NR^8N(R^9)(R^{10})$$

wherein $R^6$, $R^7$, $R^9$ and $R^{10}$ are saturated straight chain, branched chain, or cyclic alkyl groups having from 1 to about 20 carbon atoms. $R^8$ in the above generic formula is a saturated alkylene straight chain group having from 1 to about 4 carbon atoms with the total carbon atoms in said diamine compound being from about 5 to about 30 carbon atoms. Suitable alkyl groups for $R^6$, $R^7$, $R^9$ and $R^{10}$ include methyl, ethyl, n-propyl, isopropyl, n-butyl, n-pentyl, isopentyl, n-hexyl, 2,2-dimethylpentyl, 2-methylpentyl, n-octyl, 2,2-dimethylhexyl, isooctyl, 2-ethylhexyl, n-noyl, n-decyl, tripropylene, n-undecyl, n-dodecyl, tetrapropylene, n-tridecyl, ethyldodecyl, 2,5,9-trimethyltridecyl, n-tetradecyl, n-pentadecyl, n-hexadecyl, n-octadecyl, eicosyl, cyclopentyl, cyclohexyl, cyclooctyl, methylcyclohexyl, 2-cyclohexyldodecyl, 12-cyclohexyldodecyl and 4-dodecylcyclohexyl. The $R^6$, $R^7$, $R^9$, and $R^{10}$ alkyl groups can be the same or different. The preferred $R^6$, $R^7$, $R^9$, and $R^{10}$ groups are methyl and ethyl groups.

Suitable $R^8$ groups include methylene, ethylene, propylene, and butylene groups. The preferred $R^8$ group is ethylene with methylene and propylene also being preferred. Diamines in which the ring size of the resulting complex with the alkyllithium involves 5, 6, or 7 atoms are very effective complexing agents.

Examples of suitable diamine complexing agents include N-methyl,N-ethyl,N'-propyl,N' - butylpropylenediamine, N-dodecyl, N,N',N'-trimethylmethylenediamine, N-octyl,N,N',N' - triethylbutylenediamine, N,N,N',N'-tetraethylpropylenediamine, and N-eicosyl,N,N',N'-trimethylethylenediamine.

The preferred diamine complexing agents are N,N,N',N'-tetramethylethylenediamine, N,N,N',N' - tetraethylethylenediamine, N,N,N',N' - tetramethylpropylenediamine, and N,N,N',N'-tetraethylpropylenediamine.

The ratio of alkyllithium to the diamine for complexation can be from 1 to 1 to 4 to 1. The preferred ratio is 1 to 1.

The trialkyl(halomethyl)silanes are reacted with a metalating agent which is an alkali metal or an alkaline earth metal such as lithium, sodium, potassium or magnesium to produce the trialkylsilylmethylmetals according to the following:

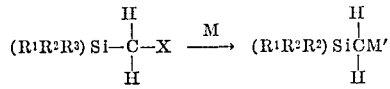

where

X=Cl, Br or I
M=Li, Na, K or Mg
M'=Li, Na, K or MgX (This method of preparing the trialkylsilylmethylmetals where M is Mg is described in J. R. Gould, L. H. Sommer and F. C. Whitmore, J. Am. Chem. Soc., 70, 2874 (1948).)

The metalating agents which can be used to react with the trialkyl(halomethyl)silanes to form the trialkylsilylmethylmetals are metallic sodium, metallic potassium, metallic lithium and metallic magnesium. The preferred metalating agent for the trialkyl(halomethyl)silanes is magnesium metal.

The trialkyl(substituted-methyl)silanes are recated with a metalating agent which is an alkyl- or aryl-sodium, an alkyl- or aryl-potassium, and an alkyl- or aryl-lithium, or a complex of an alkyllithium and an alkylenediamine, hereinbefore described, to produce the trialkylsilyl(substituted)methylmetals according to the following:

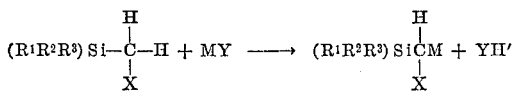

where
X is an electron-withdrawing group hereinbefore described
M=Na, K or Li
Y=an alkyl group or aryl group
[Where X, R¹, R² and R³ are phenyl, this method of preparation is described in H. Gilman and H. Hartzfeld, J. Am. Chem. Soc., 73, 5878 (1951)].

Suitable metalating agents for reaction with the trialkyl(substituted-methyl)silanes to form the trialkylsilyl (substituted)methylmetals are alkyl- or aryl-sodiums, potassiums or lithiums, wherein the alkyl or aryl group contains from 1 to about 20 carbon atoms, and the complexes of the alkyllithiums and the diamines hereinbefore described. Because of the fact that in the trialkyl (substituted-methyl)silane an electron-withdrawing group is present, a greater variety of alkyl- or aryl-sodiums, potassiums, and lithiums are reactive towards these silanes. The preference for attachment for the alkali metal to the primary carbon atom is not as great as in the situation hereinbefore described with the trialkylmethylsilane.

Suitable alkyllithiums, alkylsodiums, and alkylpotassiums for use as the metalating agent are those wherein the alkyl groups are straight chain, branched chain and cyclic containing from 1 to about 20 carbon atoms, e.g., methyl, ethyl, propyl, n-butyl, 3-methylbutyl, isopropyl, n-pentyl, isopentyl, n-hexyl, n-heptyl, n-octyl, n-decyl, tetrapropylene, 4-propylundecyl, n-hexadecyl, n-dodecyl, eicosyl, cyclohexyl, cyclopentyl, and methylcyclohexyl.

Suitable aryl groups for use in the aryl-sodiums, potassiums and lithiums are the following: phenyl, biphenyl and naphthyl groups and the substituted aryl groups such as tolyl, xylyl, and decylphenyl. Aralkyl or alkaryl groups such as phenyldecyl, butylphenyl, and 4,4-diphenylbutyl are also suitable.

The preferred metalating agents for the trialkyl (substituted-methyl)silanes are n-butyllithium and the complexes of the alkyllithiums with the diamines hereinbefore described as preferred for metalating the trialkylmethylsilanes.

The metalating agents are normally sold commercially with an excess of a liquid saturated hydrocarbon such as pentane, hexane, octane, cyclohexane, isooctane, nonane, or decane. However, any saturated hydrocarbon having from 5 to 16 carbon atoms and being either straight chain, branched chain or cyclic can be used. The concentration of the metalating agent is usually about 1.5 molar and can range from 1 molar to 3 molar concentration. In addition to the saturated hydrocarbon solvents, ether solvents such as diethyl ether, dibutyl ether, tetrahydrofuran, dioxane, and 1,2-dimethoxyethane can also be used in the metalating step. The preferred solvent is hexane because the boiling point is optimum and thus it is easily removed by distillation without any adverse affects on the metalated silane. Other preferred solvents are pentane and heptane. Tetrahydrofuran is also preferred.

The metalation reaction must take place in an inert atmosphere, e.g., nitrogen, argon, or helium since the organo-metallic compounds are highly reactive and will be decomposed if exposed to a reactive atmosphere, such as air or moisture. The preferred inert atmosphere is argon.

The temperature of the reaction can be any temperature at which the reaction mixture is liquid, i.e., above about −60° C. The temperature is usually less than about 100° C. since organometallic compounds tend to decompose above this temperature. The preferred temperature is about 20° C. (room temperature).

A stoichiometric amount or an excess of the silane in relation to the metalating agent is preferably employed to prevent excess metalating agent from interfering with the subsequent reaction with carbonyl compounds. If excess metalating agent is present it is readily reacted with and competes in subsequent reactions with the carbonyl compounds. The silane can even be used as the reaction medium in ratios as high as 4:1 with respect to the metalating agent.

Where X, in the trialkyl (substituted-methyl)silanes, is the diphenylthiophosphinyl group, the diphenylphosphino group, the trimethylsilyl group or the methylthio group, and these silanes are metalated to form the lithium, sodium or potassium organometallics, the resulting compounds are new classes of compounds. These new classes of compounds are specifically the trialkylsilyl(diphenylthiophosphinyl)methylmetals, the trialkylsilyl(trimethylsilyl)methylmetals, the trialkylsilyl(diphenylphosphino)methylmetals and the trialkylsilyl(methylthio)-methylmetals. All of these compounds are useful to produce known substituted olefins. For example: where trialkylsilyl(diphenylphosphino)methylmetal is reacted with benzaldehyde, β-styryldiphenylphosphine, $$(C_6H_5)_2PCH=CHC_6H_5$$

a known compound [see D. Gloyna and H. H. Henning, angew. Chem. internat. Edit., 5, 847 (1966)] is obtained; where trialkylsilyl(methylthio)methylmetal is reacted with benzaldehyde, $CH_3SCH=CHC_6H_5$, β-styryl methyl sulfide, a known compound [see M. C. Caserio, R. E. Pratt and R. J. Holland, J. Am. Chem. Soc., 88, 5747 (1966)] is obtained; where trialkylsilyl(trimethylsilyl)-methylmetal is reacted with benzaldehyde, $$(CH_3)_3SiCH=CHC_6H_5$$

β-styryltrimethylsilane, a known compound [see L. H. Sommer et al., J. Am. Chem. Soc., 76, 1613 (1954)] is obtained. [$(R^1R^2R^3)SiCH=CHC_6H_5$ is also formed.]

CARBONYL COMPOUNDS

The carbonyl compounds which are useful and can be advantageously employed in this invention are of the following general formula:

wherein each R⁴ and R⁵ is selected from the group consisting of hydrogen and alkyl, aryl, alkaryl, aralkyl, cycloalkyl and, where R⁴ is taken together with R⁵, bivalent alkylene groups, said groups having from 1 to about 30 carbon atoms, said carbonyl compound containing 40 or less carbon atoms and preferably less than 30 carbon atoms. Upon reaction with the carbonyl compound the metalated silanes yield olefins of the following general formula

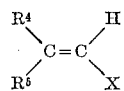

wherein R⁴, R⁵ and X (except not a halogen atom) are as hereinbefore described.

Where R⁴ and R⁵ are alkyl groups suitable groups are as follows: methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, n-nonyl, n-decyl, tripropylene, n-undecyl, n-dodecyl, tetrapropylene, n-tridecyl, n-tetradecyl, n-pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, and cyclooctyl groups.

Other suitable $R^4$ and $R^5$ groups include aryl groups such as phenyl, biphenyl, and naphthyl groups and substituted aryl groups such as tolyl, dodecylphenyl, 2-methyl-4-biphenyl, 4-methyl-1-naphthyl, 4-octyl-2-naphthyl, and 2,4-dimethylphenyl groups. Still other examples of suitable groups for $R^4$ and $R^5$ include aralkyl groups such as 3-phenyldodecyl, 4-phenyloctyl, 4-phenyldecyl, 4-phenylbutyl, 4-tolylmethyl, 3-(2-naphthyl)propyl, 4-(1-naphthyl)butyl, 3-biphenylpentyl, and 3-biphenylpropyl groups.

Other substituted $R^4$ and $R^5$ groups which are suitable include 3-(p-tolyl)propyl, 4-phenylbutyl, 4-(1-naphthyl)-hexyl, 3-(ethylnaphthyl)propyl, 3-(4-biphenyl)propyl, 3-(dimethyl)propyl, and 3,3-diethylhexyl. Where $R^4$ and $R^5$ are taken together, as a bivalent alkylene group, suitable bivalent alkylene groups are ethylene, propylene, butylene, pentalene, octalene, decalene, hexadecalene and eicosalene.

Phenyl and methyl are preferred as the $R^4$ and $R^5$ groups. Also preferred are alkyl groups having from 1 to 8 carbon atoms in each $R^4$ and $R^5$ group.

The reaction of the metalated silane with the carbonyl compound is carried out in an inert atmosphere such as argon, although nitrogen and helium are also suitable and preferred. The reaction is normally conducted in a solvent medium and at a temperature of from about $-60°$ C. to about 100° C. The preferred temperature is about 20° C. (room temperature). Suitable solvent mediums are saturated hydrocarbons having from about 5 to 16 carbon atoms such as pentane, hexane, heptane, octane, isooctane, cyclopentane, cyclohexane, and cycloheptane and aromatic hydrocarbons such as benzene, toluene, and xylene. Ether solvents such as tetrahydrofuran, dioxane, 1,2-dimethoxyethane, dibutyl ether and diethyl ether are also suitable for the purpose of this invention as solvents. Ether solvents such as tetrahydrofuran are preferred.

In some cases on reaction of the carbonyl compound with the metalated silane a relatively stable metal alkoxide is formed. For example, the magnesium (Grignard) entity, $(R^1R^2R^3)SiCH_2MgX$, forms a magnesium alkoxide, which on acidification with dilute ammonium chloride yields the ($\beta$-hydroxyalkyl)trialkylsilane. The ($\beta$-hydroxyalkyl)trialkylsilane is converted to the corresponding olefin by reaction with sodium or potassium hydride or potassium-t-butoxide. The conversion of the ($\beta$-hydroxyalkyl)-trialkylsilane to the sodium, potassium, or butoxide intermediate to form the olefin is preferred in some cases because of kinetic considerations, i.e., where the decomposition of the alkoxide into the olefin is slow.

In the reaction of the trialkylsilyl organometallic with a carbonyl compound, the following well-known compounds are produced:

(a) where benzophenone is reacted with a trialkylsilylmethylmetal styrene is produced, which is a well-known monomer useful in the manufacture of plastics, synthetic rubbers and resins;

(b) where octanal is reacted with a trialkylsilylmethylmetal 1-nonene is produced, which is useful in organic synthesis, as a wetting agent and as a lubricating oil additive, see Elizabeth and Arthur Rose, Condensed Chemical Dictionary, 7th ed., p. 677, Reinhold, New York, 1966;

(c) where acetone is reacted with a trialkylsilylmethylmetal, isobutylene is produced and the isobutylene is useful in the production of isooctane, butyl rubber, polyisobutene resins and copolymer resins with butadiene and acrylonitrile, see Condensed Chemical Dictionary, op. cit. supra, p. 518.

Other compounds produced by utilizing this invention are known compounds as shown by the cited references, e.g.:

(a) the reaction of benzophenone with a trialkylsilylphenyl)methylmetal produces triphenylethylene, see Heilbron, Dictionary of Organic Compounds, vol. 5, p. 3199, Oxford University Press, 1965;

(b) the reaction of acetone with a trialkylsilyl(phenyl)methylmetal produces $\beta,\beta$-dimethylstyrene, see Heilbron, vol. 4, p. 2300, op. cit. supra;

(c) the reaction of benzophenone with a trialkylsilylmethylmetal produces 1,1-diphenylethylene, see The Merck Index of Chemicals and Drugs, 7th ed., p. 381, Merck & Co., Rahway, N.J., 1960;

(d) the reaction of a trialkylsilyl(trimethylsilyl)methylmetal with benzaldehyde produces $\beta$-styryltrimethylislane, see E. A. Chemphev and N. G. Tolstikova, Isv. Akad. Nauk SSSR, Otd. Khim. Nauk, pp. 1223–8, (1962) [C.A., 58, 5712h (1963)];

(e) the reaction of a trialkylsilyl(diphenylphosphino)-methylmetal with benzaldehyde produces $\beta$-styryldiphenylphosphine. see H. Hoffmann and H. J. Diehr, Chem. Ber., 98, 363–8 (1965);

(f) the reaction of a trialkylsilyl(methylthio)methylmetal with benzaldehyde produces $\beta$-styryl methyl sulfide, see G. Wittig and M. Schlosser, Chem. Ber., 94, 1373–83 (1961);

(g) the reaction of a trialkylsilyl(phenyl)methylmetal with cyclohexanone produces cyclohexylidenephenylmethane, see S. Trippett and D. M. Walker, J. Chem. Soc., 1266, (1961).

As can be seen by the above, compounds produced by the process of this invention are useful in many ways—particularly in the synthesis of polymeric materials useful as plastics, resins and synthetic rubbers.

All parts, percentages and ratios herein are by weight unless otherwise specified. The following examples are illustrative of the invention and should not be taken as limiting the scope of the claims.

EXAMPLES

GENERAL

All reactions and procedures hereinafter described were performed in an atmosphere of oxygen-free argon. The nmr spectra were obtained on Varian Associates HR–60 (phosphorus) and HA–100 (proton) spectrometers. The infrared spectra were obtained on a Perkin-Elmer Infracord spectrometer. The gas-liquid phase chromatography was done on an Aerograph instrument using a SE–30 column on Chromosorb W. The mass spectrographic analyses were obtained on an Atlas CH–4 mass spectrometer.

The following example, given generically, sets forth the procedure followed in the examples referred to in the tables which are to follow hereafter. The tables which follow each step refer to the step of the procedure which preceeds it, e.g., the metalated silanes prepared in step (a) are summarized in Table I immediately following step (a) and the olefins prepared in step (b), by reaction of the metalated silanes with the carbonyl compounds, are summarized in the Table II immediately following step (b). The two tables are co-ordinated through the correspondence of the example numbers, e.g., Example 1 in Table I, step (a) continues as Example I in Table II step (b).

(a) Preparation of metalated silanes (1) Halomethylsilanes: 0.05 mole of the trialkyl(halomethyl)silane in 50 ml. of hexane was added dropwise to 0.1 g. at. wt. of an alkali metal (e.g., sodium, lithium, or potassium) dispersed in 50 ml. of hexane or of magnesium ribbon suspended in 50 ml. of tetrahydrofuran undeer a blanket of argon. The unreacted metal was filtered off subsequently.

(2) Methylsilanes: 0.05 mole of the trialkylmethylsilane in 50 ml. of hexane was added to 0.05 mole of (1) an alkylsodium, (2) an alkylpotassium, or (3) a complex of an alkyllithium and an N,N,N',N' - tetraalkylenediamine, prepared by mixing equal molar amounts (0.05 mole) of the alkyllithium and the diamine. The reaction was stirred for three days at room temperature.

(3) (Substituted-methyl)silanes: 0.05 mole of trialkyl (substituted-methyl)silane in 50 ml. of hexane was added dropwise to 0.05 mole of (1) an alkyl- or aryl-sodium (2) an alkyl- or aryl-potassium (3) an alkyl- or aryllithium, or (4) a complex of an alkyllithium and an N,N,N′,N′ - tetraalkylalkylenediamine prepared as in sub-step (2) of step (a) above and subsequently stirred for 1 to 4 hours.

The trialkylsilylmethylmetals, as prepared in sub-steps (1) or (2) above of step (a) above, the trialkylsilyl-(substituted)methylmetals, as prepared in sub-step (3) of step (a) above, or the trialkylsilylmethylmagnesium halide (Grignard), as prepared in sub-step (1) of step (a) above, were analyzed either using $H^1$ nmr spectroscopy, $p^{31}$ spectroscopy or IR spectroscopy or, in some cases they were deuterated and then analyzed using a mass spectrograph, to confirm the presence of the metalated silane.

trimethylsilyl(phenyl)methylpotassium,
trimethylsilyl(phenyl)methylsodium,
triethylsilyl(phenyl)methyllithium,
triethylsilyl(methylthio)methylpotassium,
ethyldimethylsilyl(methylthio)methylsodium,
(2,2-dimethylhexyl)dimethylsilyl(trimethylsilyl)methyllithium,
tributylsilyl(diphenylphosphino)methylsodium,
cyclohexyldimethylsilyl(diphenylthiophosphinyl)methylpotassium,
dodecyldimethylsilyl(trimethylsilyl)methyllithium,
decyldimethyl(trimethylsilyl)methyllithium,
cyclopentylhexadecylmethylsilyl(diphenylphosphino)methylpotassium, and
propyl(2-methylbutyl)methylsilyl(methylthio)methylsodium.

When in step (a) above, other trialkylmethylsilanes are substituted for the tetramethylsilane of Example 15, TABLE I, Step (a).—PREPARATION OF THE METALATED SILANE

| Example | Silane | Metalating agent | Metalated silane preparation method | Metalated silane formed |
|---|---|---|---|---|
| 1 | $(CH_3)_3SiCH_2Cl$ | Mg | Sub-step (1) | $(CH_3)_3SiCH_2MgCl$ |
| 2 | $(CH_3)_3SiCH_2Cl$ | Mg | do | $(CH_3)_3SiCH_2MgCl$ |
| 3 | $(CH_3)_3SiCH_2Cl$ | Mg | do | $(CH_3)_3SiCH_2MgCl$ |
| 4 | $(CH_3)_3SiCH_2Cl$ | Mg | do | $(CH_3)_3SiCH_2MgCl$ |
| 5 | $(CH_3)_3SiCH_2Cl$ | Mg | do | $(CH_3)_3SiCH_2MgCl$ |
| 6 | $(CH_3)_3SiCH_2C_6H_5$ | $n\text{-}C_4H_9Li\cdot TMEDA$ [1] | Sub-step (3) | $(CH_3)_3SiCH(C_6H_5)(Li)$ |
| 7 | $(CH_3)_3SiCH_2C_6H_5$ | $n\text{-}C_4H_9Li\cdot TMEDA$ | do | $(CH_3)_3SiCH(C_6H_5)(Li)$ |
| 8 | $(CH_3)_3SiCH_2C_6H_5$ | $n\text{-}C_4H_9Li\cdot TMEDA$ | do | $(CH_3)_3SiCH(C_6H_5)(Li)$ |
| 9 | $(CH_3)_3SiCH_2C_6H_5$ | $n\text{-}C_4H_9Li\cdot TMEDA$ | do | $(CH_3)_3SiCH(C_6H_5)(Li)$ |
| 10 | $(CH_3)_3SiCH_2P(C_6H_5)_2$ | $n\text{-}C_4H_9Li$ | do | $(CH_3)_3SiCH[P(C_6H_5)_2](Li)$ |
| 11 | $(CH_3)_3SiCH_2P(C_6H_5)_2$ | $n\text{-}C_4H_9Li$ | do | $(CH_3)_3SiCH[P(C_6H_5)_2](Li)$ |
| 12 | $(CH_3)_3SiCH_2P(S)(C_6H_5)_2$ | $n\text{-}C_4H_9Li$ | do | $(CH_3)_3SiCH[P(S)(C_6H_5)_2](Li)$ |
| 13 | $(CH_3)_3SiCH_2SCH_3$ | $n\text{-}C_4H_9Li$ | do | $(CH_3)_3SiCH(SCH_3)(Li)$ |
| 14 | $(CH_3)_3SiCH_2SCH_3$ | $n\text{-}C_4H_9Li$ | do | $(CH_3)_3SiCH(SCH_3)(Li)$ |
| 15 | $(CH_3)_3SiCH_3$ | $n\text{-}C_4H_9Li\cdot TMEDA$ | Sub-step (2) | $(CH_3)_3SiCH_2Li$ |

[1] N,N,N′,N′-tetramethylethylenediamine.

When in step (a) of Examples 1–5 above other trialkyl(halomethyl)silanes are substituted on a molar basis for the trimethyl(chloromethyl)silane or when sodium, potassium, or lithium is substituted on an equivalent basis for the magnesium as the metalating agent, substantially equivalent results are obtained in that the corresponding trialkylsilylmethylmetals are obtained, e.g., trimethylsilylmethyllithium, triethylsilylmethylpotassium, ethyldimethylsilylmethylsodium, (2,2 - dimethyl)-hexyldimethylsilylmethyllithium, tributylsilylmethylpotassium, cyclohexyldimethylsilylmethylpotassium, and dodecyldimethylsilylmethylsodium.

When in step (a) other trialkyl(substituted-methyl) silanes are substituted on a molar basis for the trimethyl (phenylmethyl)silane of Examples 6–9, for the trimethyl (diphenylphosphinomethyl)silane of Examples 10–11, for the trimethyl(diphenylthiophosphinylmethyl)silane of Example 12, or for the trimethyl(methylthiomethyl)silane of Examples 13 and 14; or when other metalating agents such as alkyl- or aryl-sodiums, potassiums, or lithiums are substituted on a molar basis for the metalating agents used, i.e., for the n-$C_4H_9Li\cdot TMEDA$ complex in Examples 6–9 or for the n-$C_4H_9Li$ in Examples 10–14, e.g., methyl, ethyl, propyl, n-butyl, n-pentyl, n-decyl, n-dodecyl, eicosyl, phenyl, tolyl and naphthyl sodiums, potassiums and lithiums, or when other complexes of alkyllithiums with N,N,N′,N′-tetraalkylalkylenediamines are substituted on a molar basis for the n-butyllithium·TMEDA complex, e.g., the complexes of methyl, ethyl, propyl, n-pentyl, n-octyl, n-decyl, n-hexadecyl and eicosyl lithiums with N-methyl,N-ethyl,N′-propyl,N′-butylpropylenediamine,
N-dodecyl,N,N′,N′-trimethylmethylenediamine,
N-octyl,N,N′,N′-triethylbutylenediamine,
N,N,N′,N′-tetraethylpropylenediamine, or
N-eicosyl,N,N′,N′-trimethylethylenediamine, substantially equivalent results are obtained in that the corresponding trialkylsilyl (substituted)methylmetals are obtained, e.g., triethylmethylsilane, ethylbutyldimethylsilane, dodecyltrimethylsilane, eicosyldipropylmethylsilane, cyclohexyldodecyldimethyl silane, (2,2 - dimethylbutyl)trimethylsilane (cyclohexyl)decyldibutylmethylsilane; or other metalating agents such as alkyl-sodiums or potassiums are substituted on an equivalent basis for the n-$C_4H_9Li\cdot TMEDA$ complex, e.g., methyl, ethyl, propyl, n-butyl, n-pentyl, n-decyl, n-dodecyl, eicosyl, phenyl, tolyl and naphthyl sodiums, potassiums and lithiums, or other complexes of alkyllithiums with N,N,N′,N′-tetraalkylalkylenediamines substituted on a molar basis for the n-$C_4H_9Li\cdot TMEDA$ complex, e.g., the complexes of methyl, ethyl, propyl, n-pentyl, n-octyl, n-decyl, n-hexadecyl and eicosyl lithiums with N-methyl,N-ethyl,N′-propyl,N′ - butylpropylenediamine, N - dodecyl,N,N′,N′-thimethylmethylenediamine, N - octyl,N,N′,N′ - triethylbutylenediamine, N,N,N′,N′-tetraethylpropylenediamine, and N - eicosyl,N,N′,N′ - trimethylethylenediamine, substantially equivalent results are obtained in that the corresponding trialkylsilylmethylmetals are obtained.

When in step (a) above, other solvents such as saturated hydrocarbons are substituted for the hexane or ether solvents are substituted for the tetrahydrofuran, either wholly or in part (e.g., 1:1 mixtures), substantially equivalent results are obtained in that the metalated silanes are prepared, e.g., hydrocarbon solvents such as: pentane, octane, isooctane, nonane, decane, isododecane, and cyclohexane for the hexane and ether solvents such as dimethyl ether, dibutyl ether, dioxane, and 1,2-dimethoxyethane for the tetrahydrofuran.

(b) Reaction of the metalated silane with the carbonyl compound

The following generic procedure was used in step (b) summarized in Table II hereinafter. The reaction mixture containing the metalated silane (refer to Table I, Examples 1–15 for more specificity) as prepared in step (a) above, was added dropwise and with stirring to an equivalent amount (0.05 mole) of the carbonyl compound,

see Table II hereinafter, dissolved in 50 ml. of tetrahydrofuran. The mixture was stirred for 30 minutes to 24 hours. The temperature was maintained below the reflux temeprature by means of a water bath. On a workup, the olefin formed [$(R^4)(R^5)C=CHX$, wherein $R^4$, $R^5$ and X are as hereinbefore described except that X is not a halogen atom], was analyzed and its structure confirmed using either $H^1$ nmr, $P^{31}$ nmr, IR spectroscopy or gas-liquid phase chromatography.

(c) Conversion of the magnesium alkoxide to the olefin

Where the metalated silane was the magnesium (Grignard) reagent, (Examples 1–5) prepared as in sub-step (1) of step (a) above, and was subsequently reacted with a carbonyl compound.

as specified in Table II, and hydrolyzed with dilute aqueous ammonium chloride, the indicated (2-hydroxyalkyl) trialkylsilane or (2 - hydroxyaralkyl)trialkylsliane was formed. This was converted to an unstable intermediate, the algali metal alkoxide, by reaction of the indicated alcohols with an equal molar amount (0.05) of sodium or potassium hydride or potassium-t-butoxide, as indicated, which upon elimination formed the specified corresponding olefins [$(R^4)(R^5)C=CHX$]. Conversion to the alkali metal alkoxide in some cases (Example 15) other than when the Grignard reagent was used was required. This was accomplished as described in step (c) above.

TABLE II, Step (b).—REACTION OF THE METALATED SILANE WITH THE CARBONYL COMPOUND

| Ex. | Carbonyl compound | Step (c) Intermediate isolated | Base used | Olefin isolated [1] | Yield, percent | Method of analysis (see key below) |
|---|---|---|---|---|---|---|
| 1 | $C_6H_5\overset{O}{\underset{\|\|}{C}}C_6H_5$ | $(CH_3)_3SiCH_2(OH)(C_6H_5)_2$ | KH | $(C_6H_5)_2C=CH_2$ | 86 | (1), (3), (4) |
| 2 | $C_6H_5\overset{O}{\underset{\|\|}{C}}C_6H_5$ | $(CH_3)_3SiCH_2C(OH)(C_6H_5)_2$ | NaH | $(C_6H_5)_2C=CH_2$ | 67 | (1), (3), (4) |
| 3 | $C_6H_5\overset{O}{\underset{\|\|}{C}}H$ | $(CH_3)_3SiCH_2C(H)(OH)(C_6H_5)$ | KH | Polystyrene [2] | 91 | (3), (4) |
| 4 | $n\text{-}C_7H_{15}\overset{O}{\underset{\|\|}{C}}H$ | $(CH_3)_3SiCH_2C(H)(OH)(n\text{-}C_7H_{15})$ | KH | $n\text{-}C_7H_{15}CH=CH_2$ | 70 | (1), (3), (4) |
| 5 | $CH_3\overset{O}{\underset{\|\|}{C}}CH_3$ | $(CH_3)_3SiCH_2C(OH)(CH_3)_2$ | t-$C_4H_9OK$ | $(CH_3)_2C=CH_2$ | 35 | [3](3) |
| 6 | $C_6H_5\overset{O}{\underset{\|\|}{C}}C_6H_5$ | None | None | $(C_6H_5)_2C=CH(C_6H_5)$ | 77 | (1), (3), (4) |
| 7 | $C_6H_5\overset{O}{\underset{\|\|}{C}}H$ | do | do | $(C_6H_5)CH=CH(C_6H_5)$ | 72 | (3), (4) |
| 8 | $CH_3\overset{O}{\underset{\|\|}{C}}CH_3$ | do | do | $(C_6H_5)CH=C(CH_3)_2$ | 50 | (1), (3), (4) |
| 9 | $c\text{-}C_5H_{10}C=O$ | do | do | $c\text{-}C_5H_{10}C=CH(C_6H_5)$ | 5 | (1), (3) |
| 10 | $C_6H_5\overset{O}{\underset{\|\|}{C}}H$ | do | do | $[(C_6H_5)_2P]CH=CH(C_6H_5)$ | 53 | (1), (2), (3), (4) |
| 11 | $C_6H_5\overset{O}{\underset{\|\|}{C}}C_6H_5$ | do | do | $[(C_6H_5)_2P]CH=C(C_6H_5)_2$ | 65 | [4](1), (2), (3), (4) |
| 12 | $C_6H_5\overset{O}{\underset{\|\|}{C}}C_6H_5$ | do | do | $(C_6H_5)_2P(S)CH=C(C_6H_5)_2$ | 80 | [5](1), (2), (3), (4) |
| 13 | $C_6H_5\overset{O}{\underset{\|\|}{C}}H$ | do | do | $CH_3SCH=CHC_6H_5$ | 64 | (1), (3), (4) |
| 14 | $C_6H_5\overset{O}{\underset{\|\|}{C}}C_6H_5$ | do | do | $CH_3SCH=C(C_6H_5)_2$ | 56 | [6](1), (3), (4) |
| 15 | $CH_3\overset{O}{\underset{\|\|}{C}}CH_3$ | $(CH_3)_3SiCH_2C(OH)(CH_3)_2$ | KH | $(CH_3)_2C=CH_2$ | 25 | (1) |

[1] Where stereoisomerism is possible, 1:1 ratios of cis to trans obtained.
[2] Polymerized on workup.
[3] Plus conversion to dibromide.
[4] C, 85.4; H, 5.9.
[5] C, 79.4; H, 5.5.
[6] C, 79.8; H, 6.3; S, 14.3.

NOTE.—(1) $H^1$ nmr. (2) $P^{31}$ nmr. (3) IR. (4) glpc.

When in step (b) above, other carbonyl compounds, e.g., formaldehyde, acetaldehyde, acetone, butanone, phenylmethylketone, propanal, octanal, butanal, p-methylbenzaldehyde, cyclohexanone, naphthaldehyde, dodecanal, pentanone, heptanone, 2,2-dimethyldodecanone, hexadecanal, eicosanone, naphthylethylketone, pentanal, cyclopentanone, cyclooctylphenylketone, (2-phenyl)-ethanal and decanone, are substituted on a molar basis for the carbonyls used in Examples 1–15, substantially equivalent results are obtained in that the corresponding olefins are obtained.

When in step (b) above, other solvents are substituted, either wholly or in part, e.g., 1:1 mixtures, for the tetrahydrofuran substantially equivalent results are obtained, e.g., dioxane, 1,2-dimethoxyethane, diethyl ether and dibutyl ether.

What is claimed is:

1. A process for the production of olefinic compounds consisting of the step of reacting
   (a) a metalated silane of the general formula

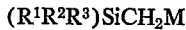
   $(R^1R^2R^3)SiCH_2M$ wherein $R^1$, $R^2$ and $R^3$ each are saturated alkyl groups having from 1 to 20 carbon atoms, said metalated silane containing 40 carbon atoms or less, and wherein M is selected from the group consisting of Li, Na, K and MgCl, MgBr and MgI, with
   (b) a carbonyl compound of the following general formula

   $$R^4\overset{\overset{O}{\|}}{C}R^5$$

wherein each $R^4$ and $R^5$ is selected from the group consisting of hydrogen and alkyl, aryl, alkaryl, aralkyl, and cyclic groups, and, where $R^4$ is taken together with $R^5$, bivalent alkylene groups, said groups having from 1 to about 30 carbon atoms, said carbonyl compound containing 40 carbon atoms or less, said reaction taking place in an inert atmosphere at a temperature of from about −60° C. to about 100° C. in an inert solvent.

2. The process of claim 1 wherein $R^1$, $R^2$ and $R^3$ each are short chain alkyl groups having from 1 to 5 carbon atoms, and wherein $R^4$ and $R^5$ each are alkyl groups having from 1 to 12 carbon atoms or aryl groups having from 6 to 12 carbon atoms.

References Cited
UNITED STATES PATENTS 3,517,042  6/1970  Peterson _____ 260—448.2

OTHER REFERENCES

"The Synthesis of Olefins and Ketones from Carbonyl Compounds and Sulfinamide," Durst and Corey, J. Am. Chem. Soc., vol. 88, pp. 5656–57 (1966).

"The Synthesis of Olefins from Carbonyl Compounds, and Phosphonic Acid Bisamides," Corey and Kwiatkowski, J. Am. Chem. Soc., vol. 88, 5602 and 53 (1966).

DELBERT E. GANTZ, Primary Examiner

J. M. NELSON, Assistant Examiner

U.S. Cl. X.R.

260—448.2

PO-1050
(5/69)

UNITED STATES PATENT OFFICE
CERTIFICATE OF CORRECTION

Patent No. 3,657,373  Dated April 18, 1972

Inventor(s) Donald J. Peterson

It is certified that error appears in the above-identified patent and that said Letters Patent are hereby corrected as shown below:

Column 1, line 34, "prepration" should read --preparation--.
Column 4, line 15, "n-noyl" should read --n-nonyl--.
Column 4, line 51, that part of the formula that reads "$(R^1R^2R^2)SiCM'$" should read --$(R^1R^2R^3)SiCM'$--.
Column 6, line 29, "H. H. Henning" should read --H. G. Henning--.
Column 7, line 75, "phenyl)methylmetal" should read --(phenyl)-methylmetal--.
Column 8, line 12, "islane" should read --silane--.
Column 8, end of line 71, "N,N,N',N'-tetra-" should read --N,N,N' tetraalkyl- --.
Column 9, Table I, Example 8, under the column headed Metalated silane formed, "$(CH_3)_3SiCH(C_6H_5)Li)$" should read --$(CH_3)_3SiCH(C_6H_5)(Li)$--.
Column 10, line 39, after the first "methylsilane" should read --
Column 10, line 51, "thimethylmethylenediamine" should read --trimethylmethylenediamine--.
Column 11, line 14, "temeprature" should read --temperature--.
Column 11, Table II, Example 1, under the column headed Intermedi: isolated, "$(CH_3)_3SiCH_2(OH)(C_6H_5)_2$" should read --$(CH_3)_3SiCH_2C(OH)(C_6H_5)_2$--.
Column 12, line 2, after "compound" delete the "." and insert --,
Column 12, line 16, "algali" should read --alkali--.

Signed and sealed this 19th day of September 1972.

(SEAL)
Attest:

EDWARD M. FLETCHER, JR.
Attesting Officer

ROBERT GOTTSCHALK
Commissioner of Patents